(12) United States Patent
Jung et al.

(10) Patent No.: US 8,338,729 B2
(45) Date of Patent: Dec. 25, 2012

(54) KEYPAD APPARATUS FOR ELECTRONIC DEVICE

(75) Inventors: Ji-Young Jung, Seoul (KR); Tae-Jin Yoon, Gyeonggi-do (KR); Yong-Jin Lee, Gyeonggi-do (KR); Jin-Hyuk Choi, Gyeonggi-do (KR); Ju-Yup Kim, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 292 days.

(21) Appl. No.: 12/607,247

(22) Filed: Oct. 28, 2009

(65) Prior Publication Data

US 2010/0126836 A1 May 27, 2010

(30) Foreign Application Priority Data

Nov. 25, 2008 (KR) .................. 10-2008-0117609

(51) Int. Cl.
*H01H 9/26* (2006.01)

(52) U.S. Cl. ........................................ 200/314; 200/5 A
(58) Field of Classification Search ............... 200/314
See application file for complete search history.

(56) References Cited

U.S. PATENT DOCUMENTS

| | | | | |
|---|---|---|---|---|
| 7,099,079 | B2 * | 8/2006 | Hibi et al. | 359/460 |
| 7,253,853 | B2 * | 8/2007 | Imamura et al. | 349/63 |
| 7,335,844 | B2 * | 2/2008 | Lee et al. | 200/310 |
| 7,442,889 | B2 * | 10/2008 | Lee et al. | 200/314 |
| 2009/0050456 | A1 * | 2/2009 | Kim et al. | 200/314 |
| 2009/0180053 | A1 * | 7/2009 | Song et al. | 349/62 |

\* cited by examiner

*Primary Examiner* — Elvin G Enad
*Assistant Examiner* — Lisa Homza
(74) *Attorney, Agent, or Firm* — Cha & Reiter, LLC

(57) ABSTRACT

A keypad apparatus for an electronic device permits a thinner construction. The keypad apparatus includes a first light guide plate having key buttons molded in one body attached onto the first light guide plate, a second light guide plate disposed under the first light guide plate, a first light source disposed at one side of the first light guide plate, a second light source disposed at one side of the second light guide plate, and key input switches associated with the key buttons.

6 Claims, 5 Drawing Sheets

KEYPAD APPARATUS FOR ELECTRONIC DEVICE

CLAIM OF PRIORITY

This application claims the benefit under 35 U.S.C. §119 (a) from a Korean Patent Application filed in the Korean Intellectual Property Office on Nov. 25, 2008 and assigned Serial No. 10-2008-0117609, the entire disclosure of which is hereby incorporated by reference in its entirety.

BACKGROUND OF THE INVENTION

1. Field of the Invention

The present invention relates generally to a keypad apparatus used for an electronic device. More particularly, the present invention relates to a keypad apparatus using a Light Guide Plate (LGP) to provide a thinner and simpler structure.

2. Description of the Related Art

FIG. 1 is a cross-sectional view illustrating a conventional LGP keypad apparatus. Referring now to FIG. 1, a light guide plate (LGP) 50 including a plurality of reflector patterns 90 is disposed over a Printed Circuit Board (PCB) 70 and a dome sheet 60, and a rubber sheet 30 having pressing protrusions 40 is disposed over the LGP 50. A film sheet 20 covers the top of the rubber sheet 30, and key buttons 10 are adhered to the film sheet 20. A light source 80 for irradiating light to the light guide plate 50 is disposed on the PCB 70, facing one side of the LGP 50.

FIGS. 3A and 3B illustrate a conventional portable wireless terminal which is slidable in a horizontal or vertical direction. As shown in the example in FIG. 3A, if a keypad 220 is open by pushing up a display unit 210 having its longest surface in the horizontal direction, a keypad with alphabet letters such as 'U', 'I', 'O' and 'P' printed thereon appears. As shown in FIG. 3B, if the keypad 220 is open in the vertical direction, a keypad 225 with Arabic numerals printed thereon appears. An LGP keypad shown in FIG. 2 is conventionally used to realize the above keypad. The LGP keypad apparatus of FIG. 2 is also manufactured as follows. A second light guide plate 140 having pressing protrusions 150 including reflector patterns 145 and a first light guide plate 130 with a plurality of reflector patterns 135 are disposed over a PCB 170 and a dome sheet 160, and a rubber sheet 120 and a film sheet 115 are disposed over the top of the first light guide plate 130. Key buttons 110 are adhered to the film sheet 115. A first light source 180 irradiates light only to the first light guide plate 130, and a second light source 190 irradiates light only to the second light guide plate 140. In this structure, by selectively activating the first light source 180 or the second light source 190, the alphabet letters, for example, 'I', 'O' and 'P' printed on the first light guide plate 130 can be displayed on the keypad, or the Arabic numerals, for example, '3', '6' and '9' printed on the second light guide plate 140 can be displayed on the keypad. Since this conventional keypad apparatus for an electronic device is complex in structure, it is thick and has a large number of parts, causing an increase in manufacturing cost and processing time.

SUMMARY OF THE INVENTION

An aspect of the present invention is to provide a keypad apparatus for an electronic device capable of reducing manufacturing cost, processing time and keypad thickness by decreasing the number of parts. According to an exemplary aspect of the invention, a keypad apparatus using a Light Guide Plate (LGP) (hereinafter referred to as an LGP keypad apparatus), includes a key button unit that is directly molded on the light guide plate by Ultraviolet (UV) molding thereby to enable a slimmer and simpler structure.

According to another exemplary aspect of the present invention, there is provided a keypad apparatus for an electronic device, including a light guide plate having key buttons molded in one (unitary) body; a light source disposed at one side of the light guide plate; and key input switches associated with the key buttons.

According to still another exemplary aspect of the present invention, there is provided a keypad apparatus for an electronic device, including a first light guide plate having key buttons molded in one body; a second light guide plate disposed under the first light guide plate; a first light source disposed at one side of the first light guide plate; a second light source disposed at one side of the second light guide plate; and key input switches associated with the key buttons.

Other exemplary aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain examples of the present invention presented herein will become more apparent from the following description taken in conjunction with the accompanying drawings, in which.

Throughout the drawings, the same drawing reference numerals will be understood to refer to the same elements, features and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary and illustrative in nature.

Accordingly, those of ordinary skill in the art will recognize that various changes and modifications of the examples described herein can be made without departing from the scope and spirit of the claimed invention. In addition, descriptions of well-known functions and constructions may be omitted for clarity and conciseness when their inclusion could obscure appreciation of the subject matter of the present invention by a person of ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 4:
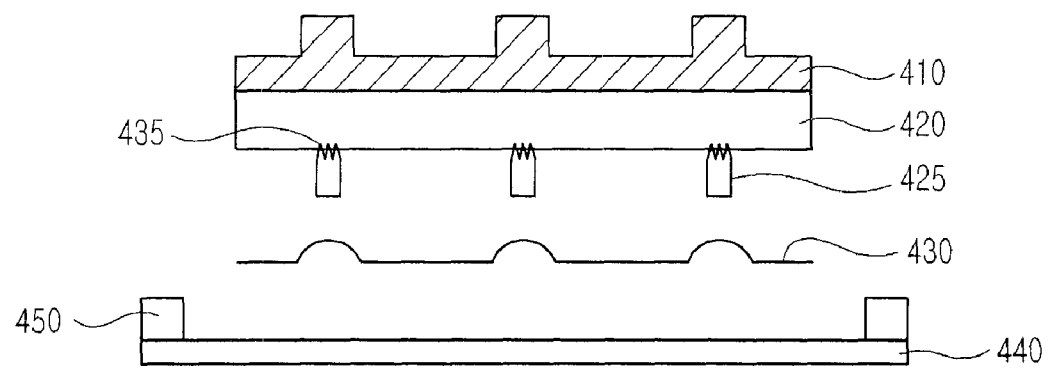
FIG. 4 is a cross-sectional view illustrating an LGP keypad apparatus according to a first exemplary embodiment of the present invention.

FIG. 4 is a cross-sectional view illustrating an LGP keypad according to a first exemplary embodiment of the present invention. Referring now to FIG. 4, key input switches 430 are mounted on a PCB 440, and a light guide plate 420 with pressing protrusions 425 formed thereon is disposed over the top of the key input switches 430. Key buttons 410 are molded on the light guide plate 420 in one body by UV molding. The UV molding is a method for molding an embossed product from a transparent film and an intaglio-processed mold 615 using a UV solidified resin.

Figure 7:
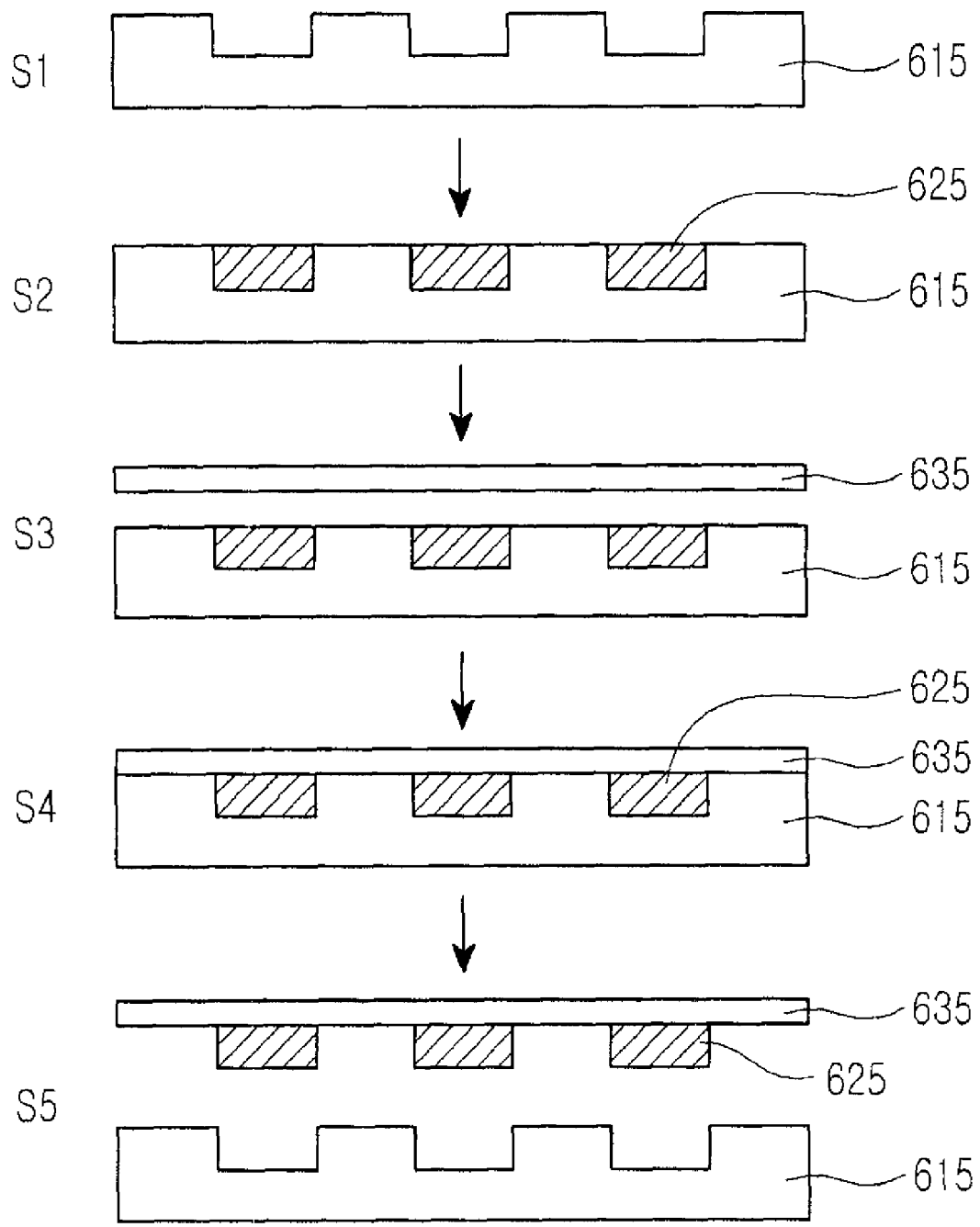
FIG. 7 is a flow diagram illustrating an UV molding process of an LGP keypad apparatus according to an exemplary embodiment of the present invention.

A UV molding process according to an exemplary embodiment of the present invention will now be described with reference to FIG. 7. In step S1, an intaglio mold 615 is prepared. In step S2, an appropriate amount of UV resin 625 is put in the mold 615 in such a manner that no bubbles are generated. In step S3, the entire surface is covered with a light guide plate 635 and then uniformly pressed to remove any bubbles that might exist in the UV resin 625. In step S4, UV is irradiated to the UV resin 625 with wavelength and irradiation dosage specific to the solidified UV resin 625. Finally, in step S5, the light guide plate 635 with the solidified UV resin 625 attached thereto is separated from the mold 615.

In this manner, it is possible to manufacture a keypad with key buttons molded on the light guide plate in one body. The light guide plate 420 of FIG. 4 can be molded by this UV molding process (shown in FIG. 7), and have pressing protrusions 425 on a lower end, for readily pressing the key input switches 430. In addition, reflection patterns 435 are formed on partial regions of the light guide plate 420, which are associated with the key buttons 410, to refract, diffract, reflect or diffuse light irradiated from a light source 450 in a direction of the key buttons 410. Letters and numerals may be printed on the top surfaces of the key buttons 410, and the letters and numerals may be recognized as being brighter by a user due to the light irradiated through the reflection patterns 435. As a result, the rubber sheet and the film sheet used in the conventional keypad apparatus can be removed, contributing to a reduction in the thickness and the number of parts.

Figure 1:
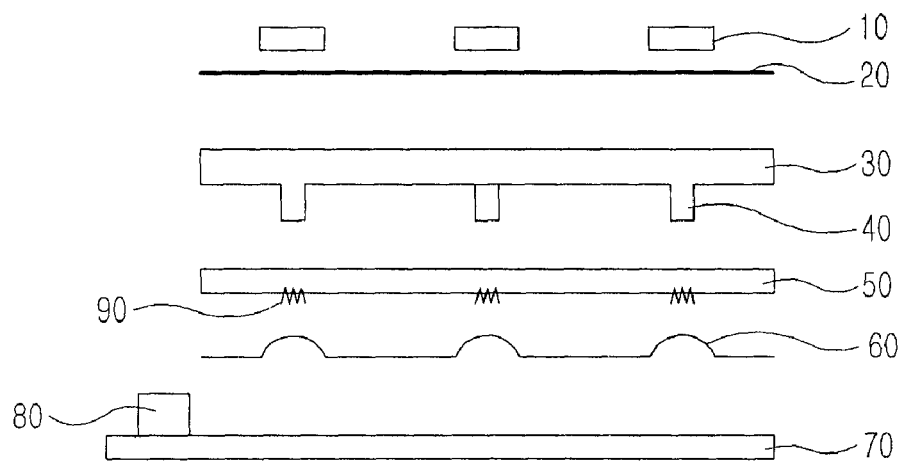
FIG. 1 is a cross-sectional view illustrating a conventional LGP keypad apparatus.
Figure 2:
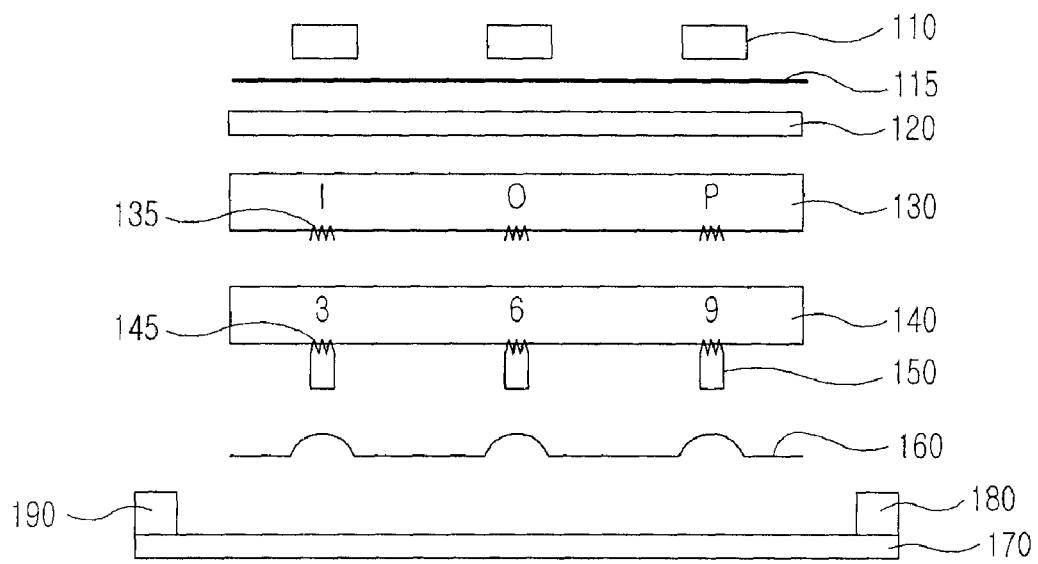
FIG. 2 is a cross-sectional view illustrating another conventional LGP keypad apparatus.
Figure 3A:
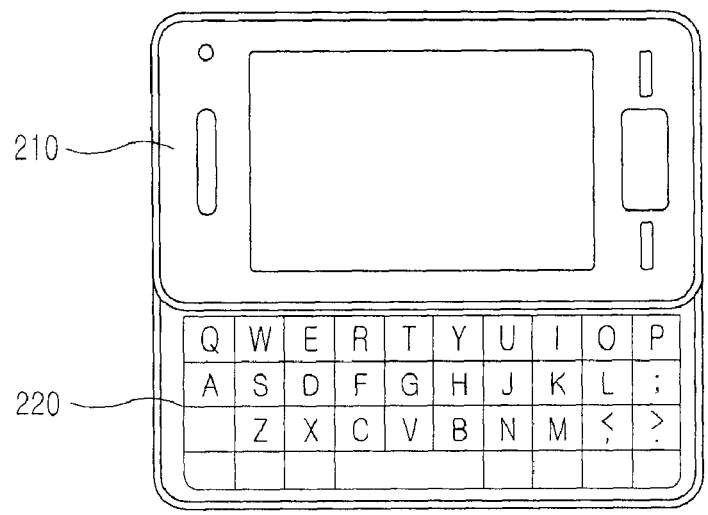
FIG. 3A is a view illustrating a horizontal/vertical sliding portable terminal with the LGP keypad apparatus of FIG. 2, with a display being open in a horizontal direction.
Figure 3B:
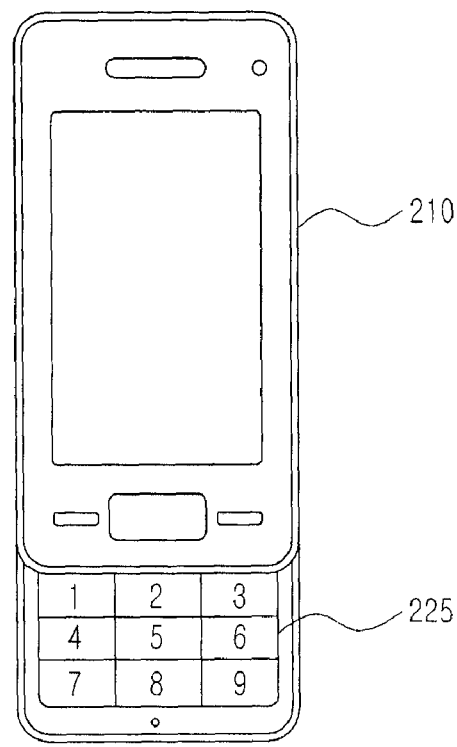
FIG. 3B is a view illustrating a horizontal/vertical sliding portable terminal with the LGP keypad apparatus of FIG. 2, with a display being open in a vertical direction.
Figure 5:
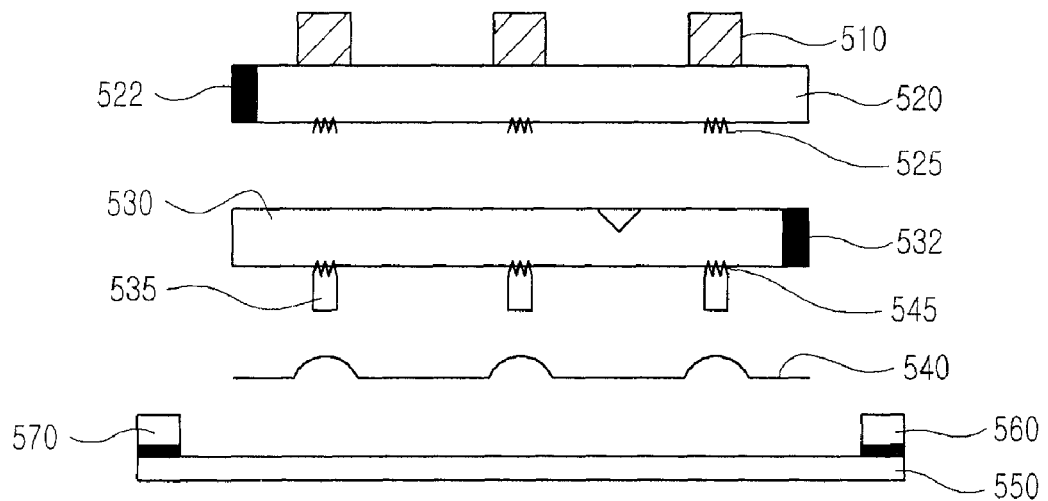
FIG. 5 is a cross-sectional view illustrating an LGP keypad apparatus according to a second exemplary embodiment of the present invention.

FIG. 5 is a cross-sectional view illustrating an LGP keypad apparatus according to a second exemplary embodiment of the present invention. The LGP keypad apparatus is a preferred example to be used as a keypad of the conventional portable wireless terminal shown in FIGS. 3A and 3B.

Referring now to FIG. 5, key input switches 540, such as in this example being a dome sheet, are disposed over a PCB 550, and a second light guide plate 530 with pressing protrusions 535 formed on the bottom and a first light guide plate 520 with key buttons 510 molded thereon on the top in one body by UV molding are disposed over the key input switches 540. Reflection patterns 525 and 545 are formed on specific regions associated with the key buttons 510, in the first light guide plate 520 and the second light guide plate 530, respectively, and serve to direct light irradiated from a first light source 560 and a second light source 570 in a direction of the key buttons 510. In addition, the first light source 560 and the second light source 570 are disposed along opposite ends of the PCB 550, facing one side or the other side of the first and second light guide plates 520 and 530, respectively. In this example, light irradiated from the first light source 560 is input to one side of the first light guide plate 520, and a light incidence preventing film 522 is formed on the other side to prevent light irradiated from the second light source 570 from being incident on the other end. Similarly, light irradiated from the second light source 570 is input to one side of the second light guide plate 530, and a light incidence preventing film 532 is formed on the other side to prevent light irradiated from the first light source 560 from being incident on the other end. Also, the light incidence preventing film can be formed all around the side surfaces except for the parts on which light to the light guide plate is incident, thereby preventing undesired light incidence or light leakage. A person of ordinary skill in the art understands and appreciates that while the first light source 560 in this example is input to one side of the first light guide plate 520 and the second light source 570 is input to the second light guide plate 530, it is within the sprit of the invention and the scope of the appended claims that the light sources could be arranged to the first light source is input to the second light guide plate, and vice versa. The first and second light sources may be operated independently of each other. Assuming that letters are printed and/or arranged on the top of the first light guide plate 520 and numerals are printed and/or arranged on the top of the second light guide plate 530, if only the first light source 560 irradiates light, the light is input only to the first light guide plate 520 and propagates in a direction of the key buttons 510 through the reflection patterns 525, so that the user can see the letters (not shown) printed on the first light guide plate 520. On the contrary, if the first light source 560 is turned off and only the second light source 570 irradiates light, the light is input only to the second light guide plate 530 and propagates in a direction of the key buttons 510 through the reflection patterns 545, so that the user can see the numerals (not shown) printed on the second light guide plate 530. That is, it is possible to selectively display letters and/or numerals on the keypad by selectively turning On/Off the first light source 560 and/or the second light source 570. Under certain lighting conditions, such selective usage of the light sources can be desirable, enhancing visibility for the desired keys.

The key buttons 510 may be separately UV-molded on the first light guide plate 520 as shown in FIG. 5, or the key buttons 410 may be collectively UV-molded on the light guide plate 420 in one body as shown in FIG. 4. It should be apparent to those skilled in the art that various modifications are possible to the key buttons (more than one body but not individual attachment of the key buttons, etc.).

As a result, a slim LGP keypad apparatus is possible, even though it uses two or more light guide plates.

Figure 6A:
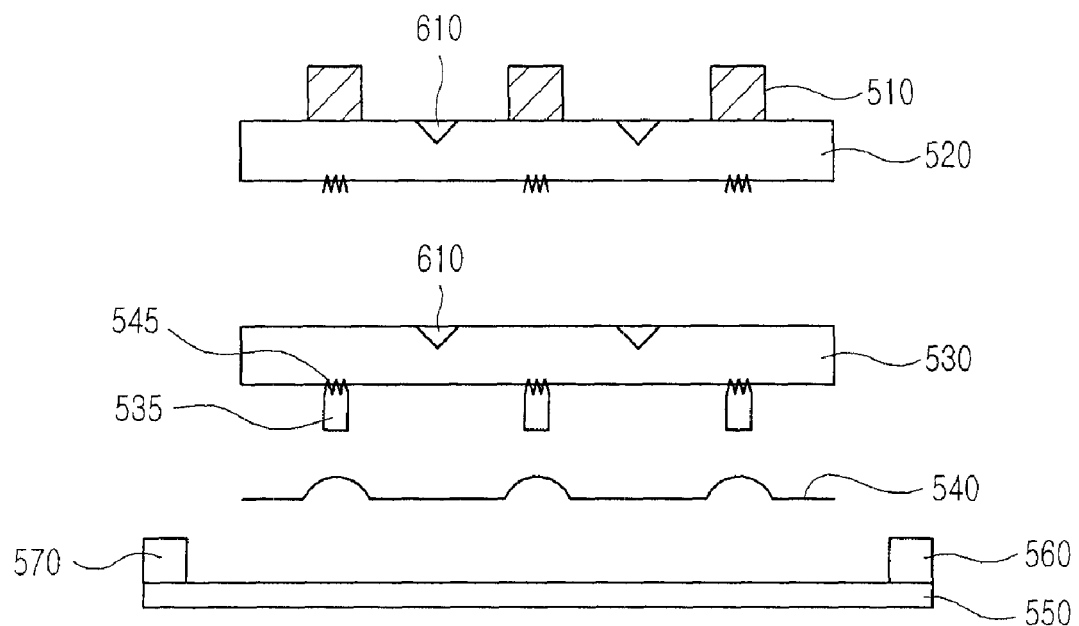
FIG. 6A is a cross-sectional view illustrating an LGP keypad apparatus according to a third exemplary embodiment of the present invention.

FIG. 6A is a cross-sectional view illustrating an LGP keypad apparatus according to a third exemplary embodiment of the present invention. Referring now to FIG. 6A, a series of notches are carved in a light guide plate so that key buttons may be more softly pressed by reducing the overall mass of the light guide plate. Specifically, V-shaped notches 610 are formed on the first light guide plate 520 and the second light guide plate 530. The notches 610 are formed around the key buttons 510 so that the key buttons 510 may be pressed down more smoothly. In case of an LGP keypad apparatus using two light guide plates, since its thickness is increased when compared to the single light guide plate arrangement, the notches may provide softer key press feeling, i.e., improved click feeling.

Figure 6B:
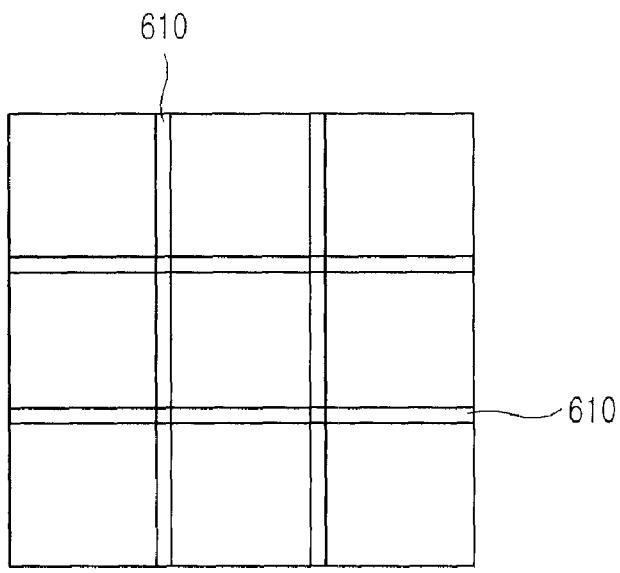
FIG. 6B is a plane view illustrating a top surface of a light guide plate with notches formed therein according to the third exemplary embodiment of the present invention.

FIG. 6B is a plan view illustrating a top surface of a light guide plate with notches 610 formed therein according to the third exemplary embodiment of the present invention.

Although the examples above include key buttons are molded on the light guide plate in one body by UV molding in exemplary embodiments of the present invention, various molding methods other than UV molding are available. While molding is clearly preferred, it is possible and within the spirit and scope of the claimed invention that the key buttons could be bonded or attached in other ways to the light guide plate(s).

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A keypad apparatus for an electronic device, comprising:
    at least one light guide plate having a plurality of key buttons molded thereon in one body by Ultraviolet (UV) molding without a rubber sheet and a film sheet therebetween;
    at least one light source disposed on a surface of a printed circuit board (PCB) and facing one side of the light guide plate;
    a plurality of key input switches associated with the key buttons and pressing protrusions arranged under the light guide plate for pressing the key input switches, wherein light incidence preventing films are formed on a respective side of each of a first and second light guide plates of the light guide plates so that light irradiated from a first light source of the light sources is incident on the first light guide plate and not incident on the second light guide plate, and light irradiated from a second light source of the light sources is incident on the second light guide plate and not incident on the first light guide plate.

2. The keypad apparatus of claim 1, further comprising reflection patterns for reflecting light irradiated from the light source in a direction of the key buttons, said reflection patterns being provided in partial regions of the light guide plate, which are associated with the key buttons.

3. A keypad apparatus for an electronic device, comprising:
    a first light guide plate having a plurality of key buttons molded thereon in one body without a rubber sheet and a film sheet between the first light guide plate and the plurality of key buttons;
    a second light guide plate disposed under the first light guide plate;
    a first light source disposed on a first end surface of a printed circuit board (PCB) and facing a first side of the first light guide plate;
    a second light source disposed on a second end surface of the printed circuit board (PCB) and facing a second side of the second light guide plate; and
    a plurality of key input switches associated with the key buttons;
    wherein light incidence preventing films are formed on a respective side of each of the first and second light guide plates so that light irradiated from the first light source is incident on the first light guide plate and not incident on the second light guide plate, and light irradiated from the second light source is incident on the second light guide plate and not incident on the first light guide plate.

4. The keypad apparatus of claim 3, further comprising pressing protrusions for pressing the key input switches, said pressing protrusions being formed under the second light guide plate.

5. The keypad apparatus of claim 3, wherein the key buttons are molded on the first light guide plate in the unitary body by Ultraviolet (UV) molding.

6. The keypad apparatus of claim 3, wherein notches are formed on at least one of the first light guide plate and the second light guide plate.

* * * * *